(No Model.) 2 Sheets—Sheet 1.
W. G. MAUK.
HITCHING DEVICE FOR HARNESS.
No. 355,544. Patented Jan. 4, 1887.
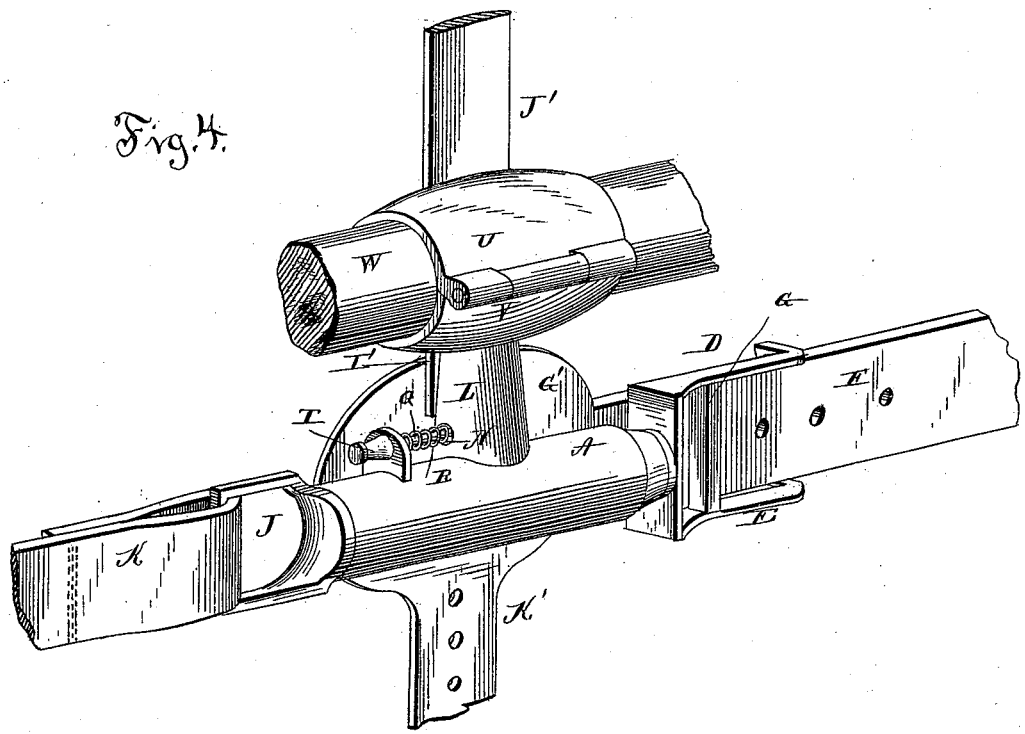
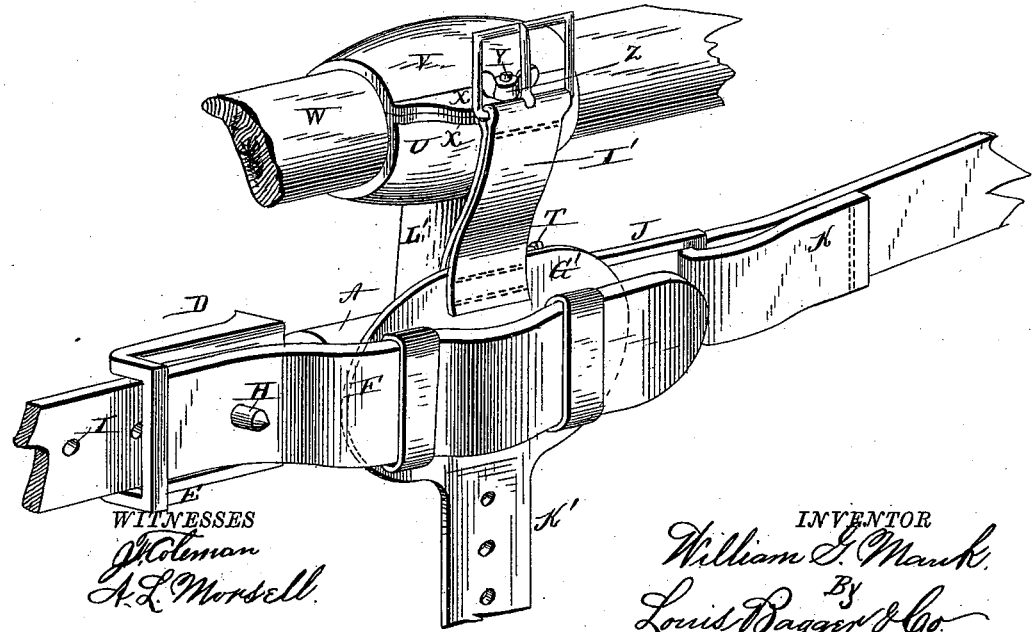
WITNESSES
INVENTOR
William G. Mauk,
By Louis Bagger & Co.
Attorneys.

(No Model.) 2 Sheets—Sheet 2.
W. G. MAUK.
HITCHING DEVICE FOR HARNESS.
No. 355,544. Patented Jan. 4, 1887.
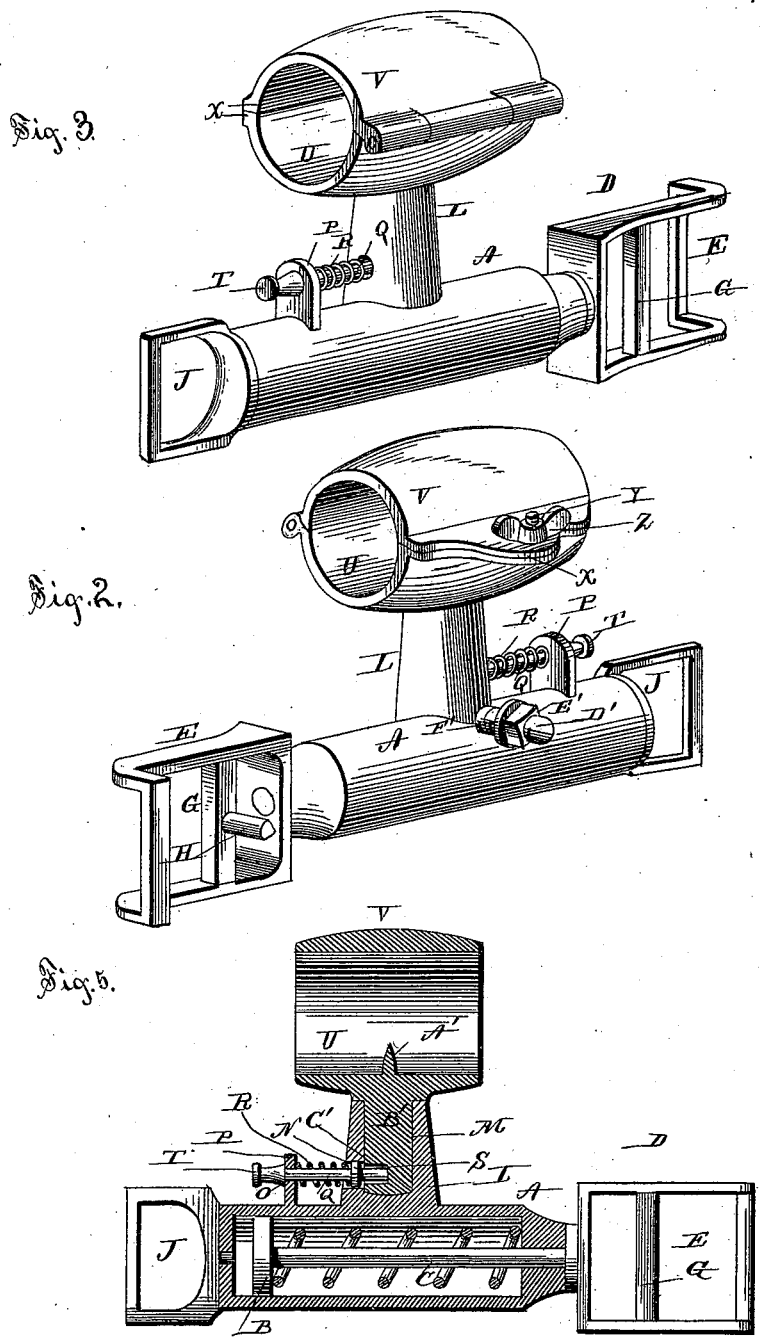
WITNESSES
J. Coleman
N. L. Morsell.
INVENTOR
William G. Mauk,
By
Louis Bagger & Co.
Attorneys.

UNITED STATES PATENT OFFICE.

WILLIAM G. MAUK, OF BASIL, OHIO.

HITCHING DEVICE FOR HARNESS.

SPECIFICATION forming part of Letters Patent No. 355,544, dated January 4, 1887.

Application filed September 10, 1886. Serial No. 213,216. (No model.)

*To all whom it may concern:*

Be it known that I, WILLIAM G. MAUK, a citizen of the United States, and a resident of Basil, in the county of Fairfield and State of Ohio, have invented certain new and useful Improvements in Hitching Devices; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of as much of a set of harness as is necessary to illustrate my invention, showing a portion of the shaft or thill of a vehicle. Fig. 2 is a similar view of the hitching device detached from the harness and seen from the outer side. Fig. 3 is a similar view of the device seen from the inner side. Fig. 4 is a view from the inner side of the device attached to the harness, showing the portions of the harness; and Fig. 5 is a longitudinal vertical sectional view of the device.

Similar letters of reference indicate corresponding parts in all the figures.

My invention has relation to that class of hitching devices in which the tug and the side portion of the harness are directly connected to the shaft or thill by means of a suitable clip and device for attaching the portions of the harness, and it contemplates certain improvements upon the device for which Letters Patent No. 334,963 were granted to me on the 26th day of January, 1886; and it consists, to that end, in the improved construction and combination of parts of such a device, as hereinafter more fully described and claimed.

In the above-mentioned device a difficulty would arise by using horses of different sizes in shafts of the same width, or in using the same horse in shafts of different widths—viz., that the portion of the device attached to the harness would at all times be parallel to the clip upon the shaft, so that in shafts considerably wider than the horse the draft of the tug would fall oblique to the line of the spring-cushioned tug-eye and piston, and for the purpose of avoiding this difficulty, which would prevent the spring-cushioned piston from working freely, I place the clip clamping the thill above the device attached to the harness and give the said clip a slight swivel motion, so that the draft upon the tug may at all times fall directly upon the piston-rod and spring to which the tug is attached, as I shall now proceed to describe more fully.

In the accompanying drawings, the letter A indicates a cylinder having a spring-cushioned piston, B, and piston-rod C extending at one end, the tug being attached to the outer end of this piston-rod, either to a plain eye, as used in my former patent, or to a buckle, D, as shown in the drawings, which buckle consists of a rectangular frame, E, having its outer end bent slightly inward, so as to form a straight passage for the billet F of the tug, and a cross-bar, G, at the inner end of the frame, the said cross-bar having an inwardly-projecting lug or thorn, H, upon which the billet may be secured by one of its perforations I.

The rear end of the cylinder is preferably provided with a suitable eye, J, for the attachment of the breeching-strap K. The upper side of the cylinder is provided with a conical projection, L, having a cylindrical bore, M, intersected from the rear side by a smaller bore, N, which registers with the bore O in an upwardly-projecting lip, P, in which bores a bolt, Q, slides, having a spring, R, coiled around it, and bearing against the forward side of the lip and against a head, S, at the forward end of the bolt, the spring forcing the bolt into the bore of the conical projection, and the bolt is provided at its rear end with a head, T, by means of which the bolt may be manipulated, and which may stop the forward motion of the bolt.

A clip composed of two semi-cylindrical portions, U and V, hinged together at their outer edges, serves to clamp around the thill W, the inner edges of the portions of the clip having perforated lips X X, through which passes a suitable screw, Y, having a thumb-nut, Z, by means of which the clip may be tightened around the thill, the lower portion, U, of the clip having an upwardly-projecting thorn or lug, A', upon its inner side, which lug may enter the thill and prevent the clip from slipping or turning upon the thill. The lower portion of the clip is formed with a downwardly-projecting lug, B', having a recess, C', in its rear side, registering with the bore in the conical projection of the cylinder, the lug fitting in the vertical bore of the said projection, and the head of the bolt may enter this recess, which is extended around at the sides of the lug, so that the lug may turn partly within its bore, and at the same time be retained within the bore by the head of the bolt. The inner side of the cylinder is provided with an inwardly-projecting screw-threaded stud, D', having a nut, E', and washer F', and a disk, G', of leather is formed with a perforation, with which it may fit upon the stud and be clamped by the washer and nut. The upper edge of this leather disk is provided with a tongue, I', having a buckle for the attachment of the back-strap J', and the lower edge of the disk is provided with a billet, K', which may be buckled into a buckle at the end of the belly-band, thus securing the disk to the harness, and the inner side of the disk is provided with a loop, L', near the forward edge, into which loop the billet of the tug may be inserted, the said billet covering the nutted end of the stud upon the cylinder.

It will now be seen that this device may be attached to a harness of any suitable construction, and that the cylindrical body of the device may have sufficient play with its conical socket upon the lug of the clip to allow the draft from the tug to be in a straight line with the piston-rod without regard to the position of the thill, and in case of a runaway the spring-bolts holding the lugs of the clips in the conical sockets may be provided with thin lines, which may be drawn back, releasing the clip from the remaining portions of the harness and allowing the horse to run out of the shafts, leaving the vehicle safe.

When the device is used with a set of harness having a collar, it is most desirable to have a plain eye for the attachment of the tug, and when the device is used with a breast-collar the buckle is the most desirable, although either the eye or the buckle may be used in either case.

It will be seen that this device will occupy less lateral space than the device shown and described in my former patent, so that it will not be as liable to press the horse in the sides if the thills are rather narrow for the size of the horse, and by doing away with the eyes for the attachment of the back-strap and belly-band the device will be less expensive of manufacture and will be equally as durable.

Having thus described my invention, I claim and desire to secure by Letters Patent of the United States—

1. In a hitching device, the combination of a cylinder having eyes for the attachment of the tug and of the breeching-strap at its ends, and formed with a conical socketed projection at its upper side, and with a stud at its inner side for the attachment to the harness, with a clip for clamping the thill, and provided with a downwardly-projecting lug fitting in the socket and being retained in the same, all substantially as described, and for the purpose shown and set forth.

2. In a hitching device, the combination of a cylinder having eyes at each end for the attachment of the tug and of the breeching-strap, respectively, and formed with an inwardly-projecting stud upon the inner side for the attachment to the harness, and with a conical socketed projection upon the upper side, and with an upwardly-projecting lip having a perforation registering with a bore entering the rear side of the socket, a clip for clamping the thill and provided with a downwardly-projecting lug fitting in the socket, and formed with a recess in its rear side extending slightly around the sides and registering with the bore in the socket, and a spring-bolt sliding in the perforated lip and in the bore of the socket entering the recess in the lug, all substantially as and for the purpose shown and set forth.

3. In a hitching device, the combination of a body portion, to which the tug and breeching are secured, a lower clip portion, V, swiveled to the upper side of the body portion, and provided with an upwardly-projecting lug, A', upon its inner side, and an upper clip portion, U, hinged to the lower portion at one edge, and a screw and nut for clamping said two portions together at the other edge, all substantially as and for the purpose shown and set forth.

4. In a hitching device, the combination of a body portion attached to the harness and having a swiveled clip for the thills, a piston-rod sliding in the forward end of the body portion and having a spring cushioning it, and a buckle consisting of a rectangular frame at the outer end of the piston-rod, formed with an inwardly-bent outer end and with a cross-bar having an inwardly-projecting thorn upon its middle, all substantially as and for the purpose shown and set forth.

5. In a hitching device, the combination, with a body portion having an eye at each end for the attachment of the tug and breeching-strap, respectively, and provided with a swiveled thill-clip upon its upper side, and formed with a screw-threaded stud upon its inner side, provided with a washer and nut, with a disk of leather having a perforation at its middle for the stud clamped by the washer and nut and formed with a buckle for the back-strap at its upper edge, and with a billet for the buckle of the belly-band at its lower edge, and having a loop for the billet of the tug upon the inner side near the forward edge, all substantially as and for the purpose shown and set forth.

In testimony that I claim the foregoing as my own I have hereunto affixed my signature in presence of two witnesses.

WILLIAM G. MAUK.

Witnesses:
EDGAR MAYNE,
ABRAHAM BROWN.